United States Patent
Soebroto et al.

(10) Patent No.: US 7,568,177 B1
(45) Date of Patent: Jul. 28, 2009

(54) SYSTEM AND METHOD FOR POWER GATING OF AN INTEGRATED CIRCUIT

(75) Inventors: Tobing Soebroto, Cupertino, CA (US); Ankur Gupta, Santa Clara, CA (US); Hendy Kosasih, Diamond Bar, CA (US); Richard Chou, Cupertino, CA (US)

(73) Assignee: Cadence Design Systems, Inc., San Jose, CA (US)

(*) Notice: Subject to any disclaimer, the term of this patent is extended or adjusted under 35 U.S.C. 154(b) by 188 days.

(21) Appl. No.: 11/589,229

(22) Filed: Oct. 30, 2006

Related U.S. Application Data

(60) Provisional application No. 60/731,239, filed on Oct. 31, 2005.

(51) Int. Cl.
*G06F 17/50* (2006.01)
*G11C 5/14* (2006.01)
*H03K 17/16* (2006.01)
*H03K 19/094* (2006.01)

(52) U.S. Cl. ............... 716/9; 716/10; 716/13; 716/14; 326/33; 326/41; 326/47; 326/101; 326/80; 365/226

(58) Field of Classification Search .......... 716/9, 716/10, 13, 14; 326/33, 41, 47, 101, 80; 365/226

See application file for complete search history.

(56) References Cited

U.S. PATENT DOCUMENTS

| | | | | |
|---|---|---|---|---|
| 5,532,896 A | * | 7/1996 | Coussens et al. | 361/56 |
| 5,672,911 A | * | 9/1997 | Patil et al. | 257/691 |
| 5,691,568 A | * | 11/1997 | Chou et al. | 257/691 |
| 5,812,478 A | * | 9/1998 | Okamura | 365/230.03 |
| 6,067,627 A | * | 5/2000 | Reents | 713/324 |
| 6,940,189 B2 | * | 9/2005 | Gizara | 307/151 |
| 7,474,584 B2 | * | 1/2009 | Yamaoka et al. | 365/226 |
| 2002/0153935 A1 | * | 10/2002 | Drapkin et al. | 327/333 |
| 2004/0071032 A1 | * | 4/2004 | Yamaoka et al. | 365/222 |
| 2005/0024908 A1 | * | 2/2005 | Gizara | 363/147 |
| 2005/0232054 A1 | * | 10/2005 | Yamaoka et al. | 365/226 |
| 2006/0097323 A1 | * | 5/2006 | Rodov et al. | 257/355 |
| 2006/0268647 A1 | * | 11/2006 | Yamaoka et al. | 365/226 |
| 2006/0279970 A1 | * | 12/2006 | Kernahan | 363/65 |
| 2008/0019205 A1 | * | 1/2008 | Yamaoka et al. | 365/226 |

FOREIGN PATENT DOCUMENTS

KR 2003059386 A * 7/2003

* cited by examiner

*Primary Examiner*—Phallaka Kik
(74) *Attorney, Agent, or Firm*—Rosenberg, Klein & Lee

(57) ABSTRACT

Apparatus and method aspects for power gating of an integrated circuit (IC) include providing at least one I/O power pad of an IC with a switch arrangement. The at least one I/O power pad is utilized to control a power signal transfer to at least a portion of the IC.

16 Claims, 4 Drawing Sheets

SYSTEM AND METHOD FOR POWER GATING OF AN INTEGRATED CIRCUIT

RELATED U.S. APPLICATION DATA

This application is based upon Provisional Patent Application No. 60/731,239, filed 31 Oct. 2005.

BACKGROUND OF THE INVENTION

The present invention relates to power gating of an integrated circuit (IC).

The proliferation of the number of components on an IC increases power consumption. With an increase in power consumption, optimization of the power supplied to various parts in the IC becomes essential. This optimization can be achieved by electrically separating a switchable portion in the IC from a portion that requires continuous power supply. To provide power supply to these electrically separated portions, various techniques for power gating of an IC have been developed.

One such technique used for power gating of an IC includes using switching devices in a ring configuration. In the ring configuration, the switching devices are placed in a ring pattern around a switchable portion of the IC. A limitation of the ring configuration approach is the additional area needed to support the separate "switched" portion of the IC and the unswitched or "always-on" portion. Sizing of the switching devices, which includes determining the optimal area of a switch cell necessary to turn on or off the target block of the "switched" portion of the IC, is especially challenging to designers. The challenge is particularly difficult when a majority of a design may need to be part of the "switched" portion.

Accordingly, a need exists for a technique that can implement power gating in an IC and overcomes these limitations. The present invention addresses such a need.

SUMMARY

Apparatus and method aspects for power gating of an integrated circuit (IC) include providing at least one I/O power pad of an IC with a switch arrangement. The at least one I/O power pad is utilized to control a power signal transfer to at least a portion of the IC.

Power gating is achieved more effectively through the present invention, by switching the power supply at the I/O pads. In this manner, minimal change to the IC design for implementing the power structure is needed, and floorplanning for switch placement in the IC is no longer needed. Additionally, the present invention also enables powering-off the IO power in one embodiment to further reduce power consumption. These and other advantages will be fully appreciated in conjunction with the following detailed description and the accompanying drawings.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF PREFERRED EMBODIMENTS

Various embodiments of the present invention relate to aspects for power gating of an integrated circuit (IC). The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
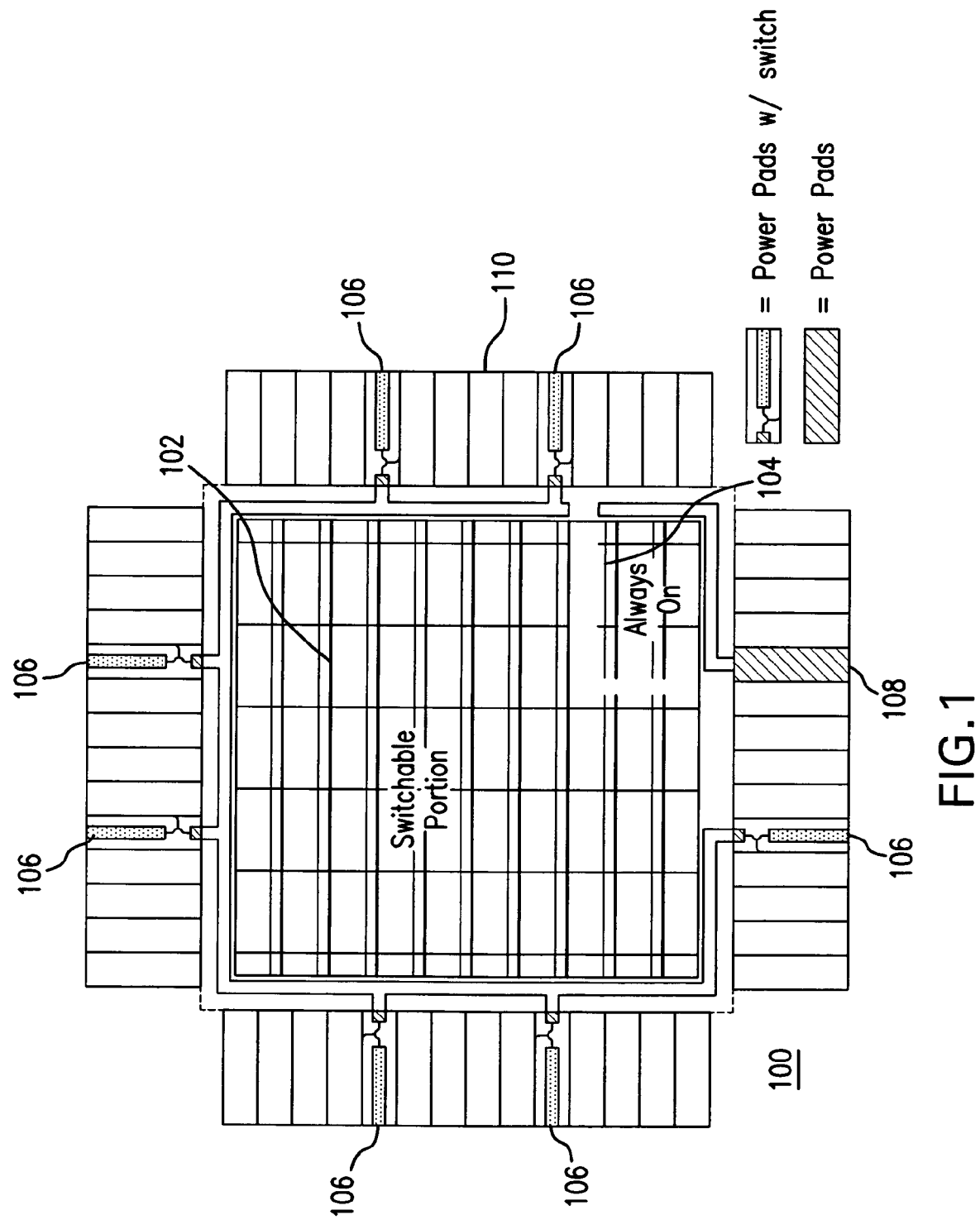
FIG. 1 illustrates a schematic of an integrated circuit, in accordance with an embodiment of the present invention.

FIG. 1 illustrates a schematic of an integrated circuit (IC) 100, in accordance with an embodiment of the present invention. IC 100 comprises a switchable portion 102, an always-on portion 104 and, a plurality of I/O pads, which include at least one first pad 106 and at least one second pad 108. Switchable portion 102 of IC 100 refers to that portion of the design that can handle being powered-off during certain modes of operation of IC 100, while always-on portion 104 of IC 100 refers to that portion that needs an uninterrupted power supply during operation of IC 100, as is well understood in the art.

Figure 2:
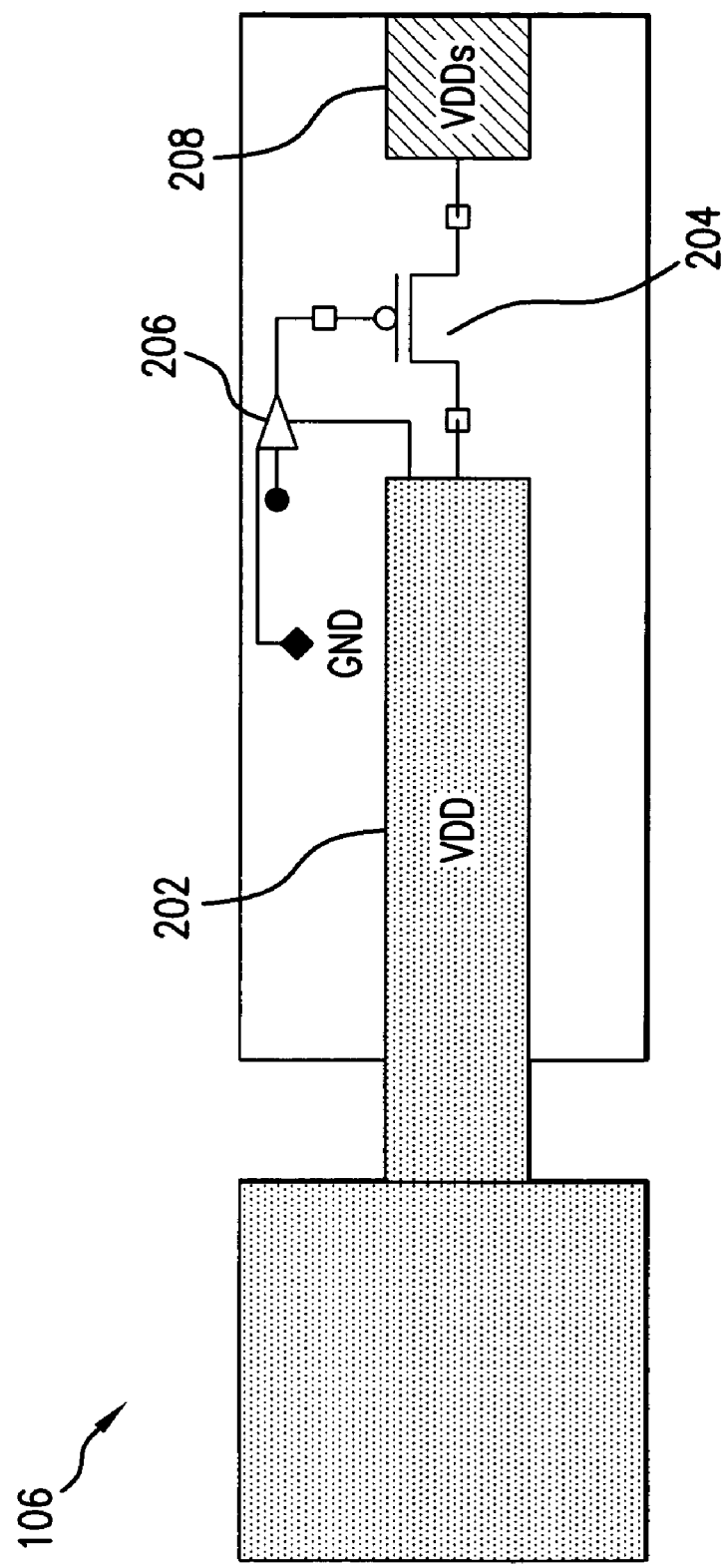
FIG. 2 illustrates a switched power pad, in accordance with an embodiment of the present invention.

In accordance with the present invention, a chosen number of first pads 106 are provided as switch integrated power pads and are utilized to control current flow to at least a portion of the IC, shown as switchable portion 102. Second pad 108 represents a regular power pad as is commonly known and that is utilized to provide uninterrupted current flow to the always on portion 104 of the IC. The first pad 106 comprises a regular power pad that has been redesigned to include a built-in power switch. FIG. 2 illustrates a detailed view of a first pad 106.

As shown in FIG. 2, first pad 106 comprises an input port 202, a switch 204, a buffer 206, and an output port 208. In an embodiment of the present invention, switch 204 is a MOSFET (metal-oxide semiconductor field-effect transistor) switch. The switch 204 is connected in series between the input port 202 and output port 208. The input port 202 provides a power supply signal (VDD) from a power supply (not shown). Buffer 206 drives the switch 204 with better slew control. Buffer 206 further connects to the input port and ground. Switch 204 turns-on and turns-off to control whether the power supply signal reaches the output port 208. This switching controls the power output to the switched portion 102 of the IC 100 (FIG. 1). With the switch 204 built into the power pad, the power supply grid can be switched at the power source level and the current flow can be shut down during power saving operation modes to reduce power consumption in the IC. Further, given that the current limit of an I/O pad is well-defined in the art, the power switch is sized according to the maximum current carrying capacity of the I/O pad. Therefore, the total switch current capacity is automatically defined by the number of power pads being used, as is well understood in the art.

Figure 3:
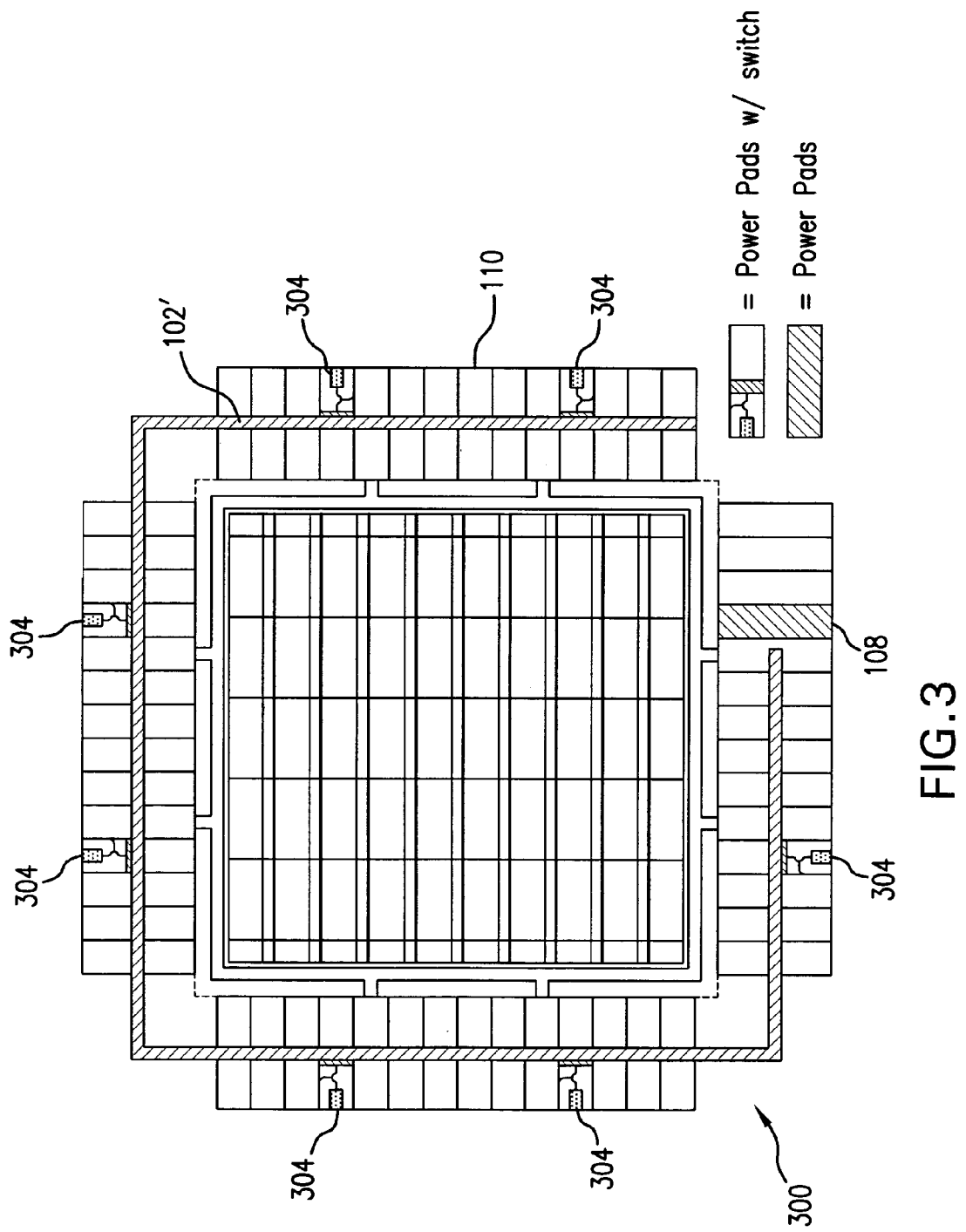
FIG. 3 illustrates a schematic of an integrated circuit, in accordance with another embodiment of the present invention.
Figure 4:
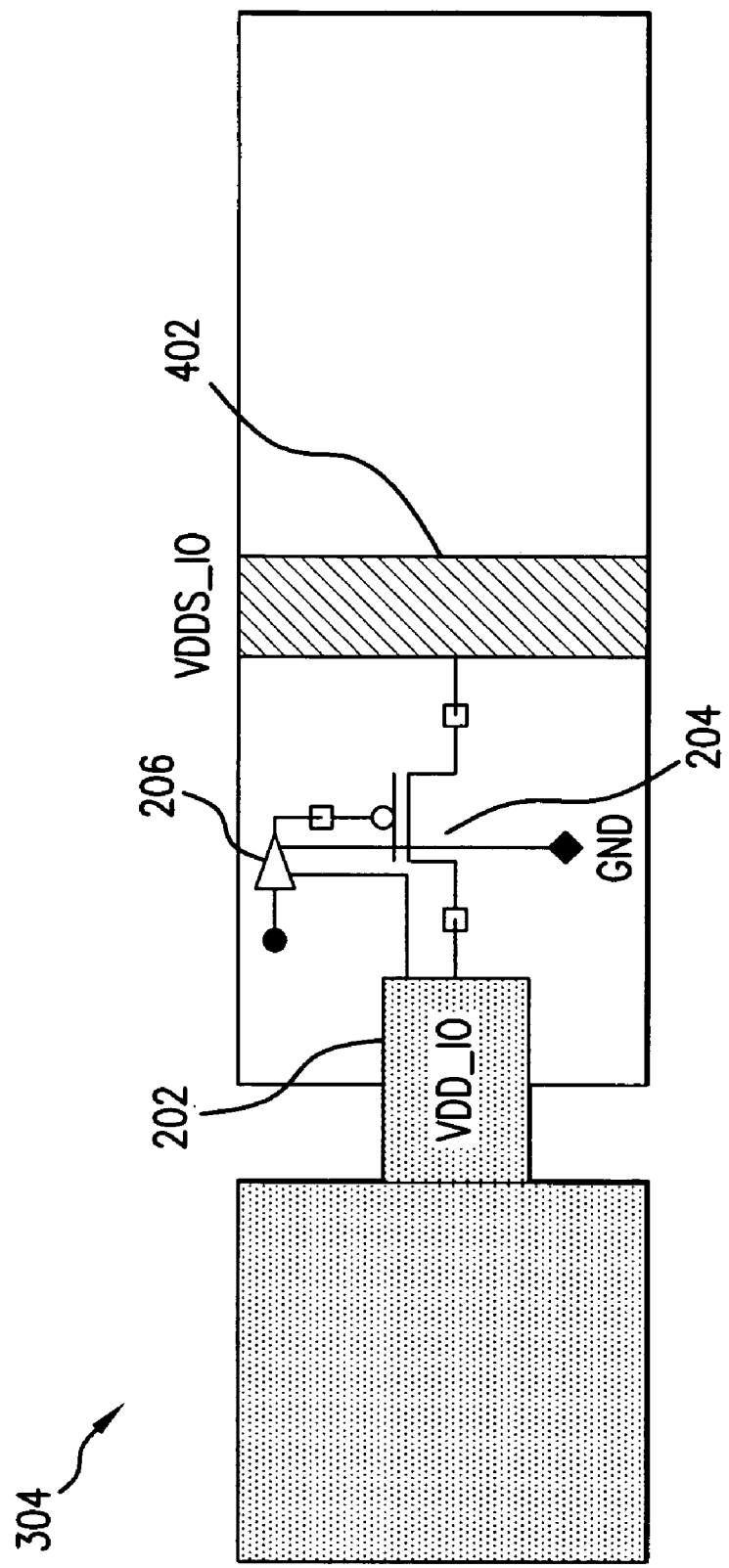
FIG. 4 illustrates a switched input-output port (I/O) pad, in accordance with another embodiment of the present invention.

FIG. 3 illustrates a schematic of integrated circuit (IC) 100, in accordance with another embodiment of the present invention. In this embodiment, the use of a switch in a power pad is implemented to control power in the set of I/O pads. Thus, the 'switchable' portion 102' in the embodiment comprises the I/O pad themselves. FIG. 4 illustrates a switch pad 304 for this embodiment Referring to FIG. 4, the switch pad 304 comprises a control circuit of a switch arrangement as previously described with reference to FIG. 2, where the switch 204 is coupled to an input port 202 and a buffer 206. The switch 204 in this embodiment is further coupled to a switch I/O port 402 that provides power to the switchable portion 102' of the I/O pads. By controlling the switching on or off of the switch 204 via buffer 206, there is control over the power that is supplied from the input port 202 to the I/O power port 402. In this manner, the I/O pads themselves are powered on/off to achieve power control at the I/O pad level.

As presented herein, the aspects of controlling power at the IC pad level achieves on-chip power gating of an integrated circuit (IC) in an efficient and effective manner. The implementation of switching devices at the pad level avoids using the silicon core area of the IC. Additionally, the corresponding power structure implementation details such as floor-planning, cell-size analysis, and optimization of the switches are not required. In this manner, those ICs with at least one mode of operation where the majority of the structure needs to be shutdown have improved design.

While the preferred embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. An apparatus comprising:
   a. an integrated circuit (IC) including a core and a plurality of individual input/output (I/O) pads surrounding the core; and
   b. a switching means formed in an integrated manner within at least one of the plurality of individual I/O pads for selectively controlling transfer therethrough of a power supply signal to at least a portion of the core.

2. The apparatus of claim 1 wherein the switching means further comprises a transistor coupled between an input port and an output port of the at least one I/O pad.

3. The apparatus of claim 2 further comprising a buffer coupled to the transistor for driving the transistor.

4. The apparatus of claim 2 wherein the input port comprises an always-on port.

5. The apparatus of claim 1 wherein the switching means comprises a MOSFET.

6. An apparatus for power gating of an integrated circuit (IC), the apparatus comprising:
   a. a plurality of individual power input/output (I/O) pads for powering an IC core, each power I/O pad including an input power supply port and an output power port; and
   b. a control circuit formed in an integrated manner within at least one of the power I/O pads and coupled between the input power supply port and the output power port, wherein operation of the control circuit selectively controls power output through the one power I/O pad thereof to the IC core from among the plurality of individual power I/O pads.

7. The apparatus of claim 6 wherein the control circuit further comprises a switch arrangement.

8. The apparatus of claim 7 wherein the switch arrangement further comprises a switch and a buffer.

9. The apparatus of claim 8 wherein the buffer drives the transistor.

10. The apparatus of claim 6 wherein the input power supply port comprises an always-on port.

11. A method for power gating of an integrated circuit (IC), the method comprising:
    a. providing at least one individual I/O power pad of an IC with a switch arrangement formed in an integrated manner therein; and
    b. utilizing the at least one I/O power pad to selectively control a power signal transfer therethrough to at least a portion of the IC.

12. The method of claim 11 wherein providing further comprises providing a switch between an input port and an output port of the I/O power pad.

13. The method of claim 12 further comprising utilizing a buffer in the switch arrangement to drive the switch.

14. The method of claim 12 wherein the input port further comprises a power supply port.

15. The method of claim 11 wherein utilizing further comprises utilizing the at least one I/O power pad to control a power signal transfer to at least a portion of a core of the IC.

16. The method of claim 11 wherein utilizing further comprises utilizing the at least one I/O power pad to control a power signal transfer among a plurality of power I/O pads.

* * * * *